United States Patent [19]

Mochimaru et al.

[11] Patent Number: 4,703,334

[45] Date of Patent: Oct. 27, 1987

[54] OPTICAL RECORDING HEAD AND BELT POSITIONING APPARATUS

[75] Inventors: Hideaki Mochimaru, Yokahama; Kazuyuki Shimada, Tokyo; Junichi Hirasawa, Hiratasuka, all of Japan

[73] Assignee: Ricoh Company, Ltd., Japan

[21] Appl. No.: 644,493

[22] Filed: Aug. 24, 1984

[30] Foreign Application Priority Data

| | | | |
|---|---|---|---|
| Aug. 26, 1983 | [JP] | Japan | 58-156151 |
| Aug. 26, 1983 | [JP] | Japan | 58-156154 |
| Sep. 20, 1983 | [JP] | Japan | 58-145727[U] |
| Oct. 28, 1983 | [JP] | Japan | 58-202122 |
| Oct. 28, 1983 | [JP] | Japan | 58-202123 |

[51] Int. Cl.[4] .......... G01D 15/14

[52] U.S. Cl. .......... 346/160; 355/63; 346/107 R; 346/155

[58] Field of Search .......... 346/107 R, 160, 136, 346/139 R, 155; 358/296, 300, 302; 355/3 BE, 63; 400/119; 101/DIG. 13; 226/104

[56] References Cited

U.S. PATENT DOCUMENTS

| | | | |
|---|---|---|---|
| 4,318,597 | 3/1982 | Kotani et al. | 346/107 R X |
| 4,494,130 | 1/1985 | Kaneko et al. | 346/160 |

FOREIGN PATENT DOCUMENTS

| | | | |
|---|---|---|---|
| 58-27463 | 2/1983 | Japan | 358/296 |

*Primary Examiner*—A. Evans
*Attorney, Agent, or Firm*—Guy W. Shoup

[57] ABSTRACT

An optical recording apparatus includes an imaging member which is advanced along a predetermined path, an optical recording head for applying light containing image information to the imaging member to form an electrostatic latent image thereon, a developing unit for developing the latent image thereby converting it into a toner image and a transfer unit for transferring the toner image to a sheet of transfer paper. With the imaging member in the form of a belt, a back-up member and a contact member, preferably in the form of brush, are provided on both sides of the belt-shaped imaging member in the vicinity of an image exposing section where the light from the recording head is applied to the imaging member thereby allowing that portion of the imaging member which is located in the image exposure section is prevented from moving up and down with respect to the advancing direction of the imaging member.

21 Claims, 18 Drawing Figures

OPTICAL RECORDING HEAD AND BELT POSITIONING APPARATUS

BACKGROUND OF THE INVENTION

1. Field of the Invention

This invention relates to apparatus for optically recording or printing an image on a recording medium, and in particular, to an optical recording apparatus including an array of light-emitting elements for recording an image on a belt-shaped recording medium.

2. Description of the Prior Art

An optical recording apparatus for optically recording an image on a recording medium, such as a photosensitive member, is well known in the art. FIG. 1 illustrates one such prior art optical recording apparatus employing a self-scanning type optical recording head 1. Also provided is an endless photosensitive belt 4 as extended between a pair of rollers 2 and 3, at least one of which is driven to rotate in the direction indicated by the arrow to cause the belt 4 to run at constant speed. As the belt 4 travels, its outside surface is uniformly charged by a corona charger 5 which is disposed upstream of the optical recording head 1 with respect to the travelling direction of the belt 4.

As will be understood later, the recording head 1 is provided with a plurality of light-emitting elements arranged in the form of a single array, which are selectively activated by a driver circuit (not shown) connected to the recording head 1 in accordance with an electrical image signal supplied thereto from an external circuitry thereby emitting light to be impinged upon the uniformly charged belt 4 in motion. As a result, the charge on the belt 4 is selectively dissipated when the light thus emitted strikes the belt 4 so that an electrostatic latent image is formed on the belt 4 as it moves past the recording head 1. Then the latent image moves past a developing station 6 where the latent image is converted into a visible image, such as a toner image.

The toner image thus formed at the developing station 6 is transported toward an image transfer station, where a transfer corona unit 11 is disposed, as riding on the moving belt 4. On the other hand, a sheet of transfer paper 10 stored in the form of a stack is also transported toward the image transfer station by means of a feed roller 7, a sheet separation roller 8 and a registration roller 9 in association with the operation of the belt 4. The sheet of transfer paper 10 is then brought into contact with the outer surface of the belt 4 on which the toner image is supported so that the toner image is transferred to the sheet of transfer paper 10 as separated from the belt 4 due to corona ions applied to the back side of the sheet of transfer paper 10 as it moves past the image transfer station. The sheet of transfer paper 10 now bearing thereon the transferred toner image is then moved past an image fixing station where the transferred toner image is permanently fixed to the sheet of transfer paper 10, which is thereafter discharged outside of the apparatus by means of paper discharging roller 13. On the other hand, after transfer of toner image to a sheet of transfer paper 10, the belt 4 receives a uniform irradiation from a charge removing lamp 14 so that the remaining charge on the belt 4 is removed. Thereafter, the belt 4 is cleaned by a cleaning device 15 to remove any unwanted material remaining on the belt 4 thereby preparing the belt 4 to be ready for the next cycle of operation.

In the illustrated example, use is made of a photosensitive member in the form of an endless belt. In such a case, the overall apparatus may be designed to be flat and compact in size and there is a high degree of freedom in arranging various image formation-related elements, such as charging, image exposing, developing and cleaning units. It is to be further noted that disposal is easier for belt-shaped photosensitive members as opposed to drum-shaped photosensitive members.

As described above, the optical recording head 1 of the illustrated example is of the self-scanning type in which a number of light-emitting elements, such as light-emitting diodes, or optical shutters, such as liquid crystal shutter elements, are arranged in the form of a single array. Instead of using such a self-scanning type recording head, use may also be made of a recording head having a single light source, such as a laser. When the laser is used, however, there must be provided such elements as oscillation control unit and a laser beam deflecting unit. Thus, in general, the laser recording head tends to be expensive and complicated in structure as compared with a self-scanning type recording head. The self-scanning type recording heads may be generally classified into two groups: light-emitting type, such as using a light-emitting diode array and a fluorescent tube array, and non-light-emitting type, such as using a liquid crystal display array.

FIG. 2 shows one example of the prior art light emitting type self-scanning optical recording head 1A. As shown, the recording head 1A includes a support plate 16, also serving as a heat sink, of aluminum or the like and a substrate 17 fixedly attached to the bottom surface of the support plate 16. On the bottom surface of the substrate 17 is provided a light source array 18 comprised of a plurality of light-emitting elements, such as light-emitting diodes and fluorescent light tubes. On both sides of the light source array 18 are provided driver I.Cs. 19 as also fixedly attached to the bottom surface of the substrate 17. Also provided are leads 20 and connectors 21 mounted on the top surface of the support plate 16 for connecting the I.C. drivers 19 to external circuitry. Below the substrate 17 is disposed a holding member 23 with a seal member 22 in the form of a closed loop sandwiched therebetween, and the holding member 23 holds an image-forming or focusing device, such as Selfoc Lens Array commercially available from Nihon Itagarasu, Inc. of Japan, in position between the light source array 18 and the photosensitive belt 4. It is to be noted that the focusing device 24 is so provided to be movable up and down in fine mode for focusing operation.

FIG. 3 on the other hand illustrates an example of the prior art non-light-emitting type self-scanning optical recording head 1B employing an LCD panel 27. As shown, the recording head 1B includes a single light source 25, the light from which is collected onto the LCD panel 27 by means of a rod lens 26 and the light passing through the panel 27 is focused onto the belt 4 by means of the focusing device 24. In this example, the LCD panel 27 and the driver I.Cs. are mounted on the same supporting structure.

As described above, in either type, use is made of the focusing device 24 to have an image focused on the belt 4. The focusing device, in particular Selfoc Lens Array used for line scanning has a rather shallow field of depth. On the other hand, the photosensitive belt 4 is often times subjected to undulating motion, whereby the belt 4 partly moves up and down in the direction normal to its transporting direction. Thus, in the case where the Selfoc Lens Array 24 is used to have an image focused onto the belt 4, the image becomes defocused in a periodic manner due to undulating motion of the belt 4 while in operation, so that the quality of printed image tends to become deteriorated.

SUMMARY OF THE INVENTION

It is therefor a primary object of the present invention to obviate the disadvantages of the prior art as described above and to provide an improved optical recording apparatus.

Another object of the present invention is to provide an improved optical recording apparatus of the self-scanning type using a recording medium in the form of a belt.

A further object of the present invention is to provide an improved optical recording apparatus compact in size and high in performance.

Other objects, advantages and novel features of the present invention will become apparent from the following detailed description of the invention when considered in conjunction with the accompanying drawings.

DESCRIPTION OF THE PREFERRED EMBODIMENTS

Figure 1:
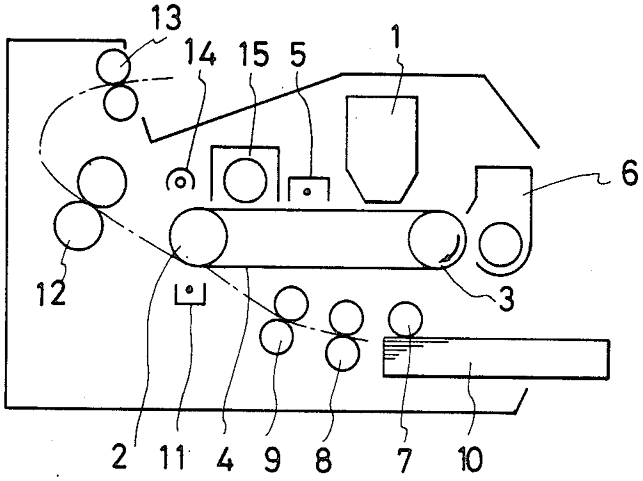
FIG. 1 PRIOR ART
FIG. 1 is a schematic illustration showing the overall structure of a typical prior art optical recording apparatus.
Figure 2:
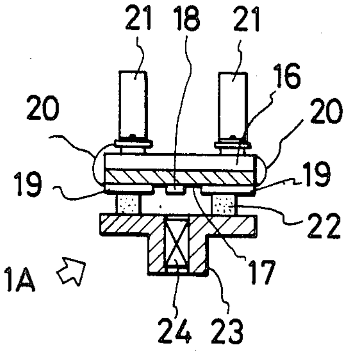
FIG. 2 PRIOR ART
FIG. 2 is a schematic illustration showing the structure of a typical prior art light-emitting type self-scanning optical recording head applicable in the system shown in FIG. 1.
Figure 3:
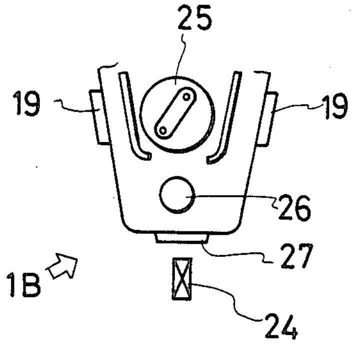
FIG. 3 PRIOR ART
FIG. 3 is a schematic illustration showing the structure of a typical prior art non-light-emitting type self-scanning optical recording head applicable in the system shown in FIG. 1.
Figure 4:
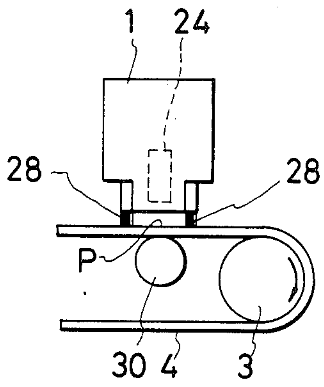
FIG. 4 is a schematic illustration showing the structure of an optical recording apparatus constructed in accordance with one embodiment of the present invention.

Referring now to FIG. 4, there is shown in schematic part of optical recording apparatus constructed in accordance with one embodiment of the present invention. It is to be noted that although only part of the apparatus is shown in FIG. 4, the optical recording apparatus of the present invention has an overall structure as shown in FIG. 1. It should further be noted that elements identical to those shown in FIG. 1 are indicated by identical numerals in FIG. 4.

As shown, the self-scanning optical recording head 1 of either the light-emitting type 1A or non-light emitting type 1B is disposed opposite to the outer surface of the endless photosensitive belt 4 such that an image formed by the recording head 1 is scanned across an imaginary scanning or exposure line P. At the inner side of the belt 4, which is opposite to the outer side where the recording head 1 is disposed, is disposed a back-up roller 30 as extending in parallel with the scanning line P and in contact with the inner surface of belt 4. The back-up roller 30 may be provided to be rotatable or not rotatable. The recording head 1 is also provided with a contact member 28 at least upstream and downstream of the scanning line P with respect to the travelling direction of the belt 4 as fixedly mounted at the bottom surface thereof. The contact member 28 is in sliding contact with the outer surface of the belt 4 such that the contact member 28 applies a light downward pressure to the belt 4 thereby allowing to hold a portion of the belt 4 always in position determined by the contact member 28 and the back-up roller 30.

With such a structure, since the belt 4 is held between the contact member 28 and the back-up roller 30 such that the contact member 28 is located partly fore of and partly aft of the scanning line P and the back-up roller 30 is arranged in alignment with the scanning line P, that portion of the belt 4 which is held between the contact member 28 and the back-up roller 30 can be maintained always in position and prevented from causing undulation and/or vibration during operation even if the other portion is subjected to such an undesired motion. Stated another way, the structure of FIG. 4 allows to maintain the distance between the focusing device 24 of recording head 1 and the scanning line P on the belt 4 always at constant, and, thus, the occurrence of defocused condition is positively and physically prevented.

The contact member 28 may be provided in the form of a closed loop or separate front and rear segments. Since the contact member 28 is kept in sliding contact with the outer imaging surface of the belt 4, it is preferably comprised of a material which is least susceptible to disturb the charge on the belt 4. Thus, the preferred material is an electrically insulating material, such as teflon or rubber. Preferably, the contact member 28 is in the form of brush. Besides, the contact member 28 is preferred to be in the form of a ring or closed loop because, in this case, the space between the recording head 1 and the belt 4 may be sealed, thereby allowing to prevent undesired foreign matter, such as debris and floating toner, from being deposited onto the bottom surface of the focusing device 24.

Figure 5:
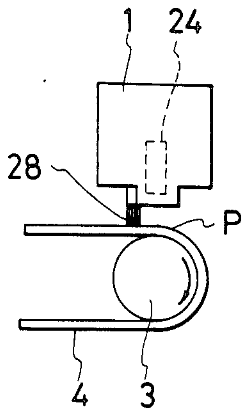
FIG. 5 is a schematic illustration showing a modification of the shown in FIG. 4.
Figure 6:
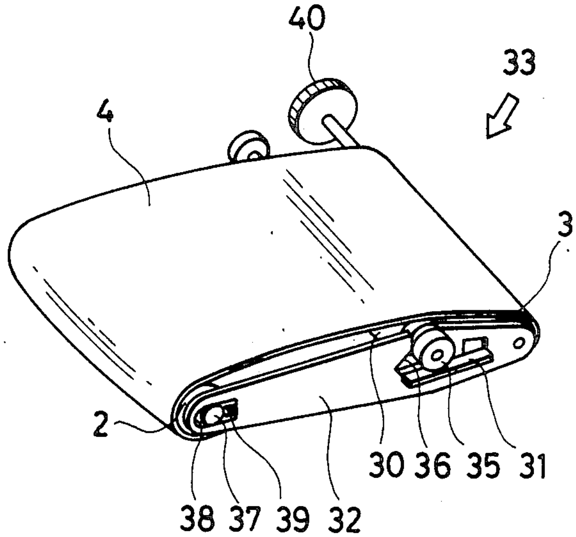
FIGS. 6–9 are schematic illustrations showing in detail the structure for holding the photosensitive member in the form of an endless belt embodying the present invention.

FIG. 5 shows a modified structure in which one of the supporting rollers (roller 3 in the illustrated example) is also used to function as the back-up roller 30 by defining the scanning line P as close as possible to one end of the belt 4. The contact member 28 of this embodiment is provided only fore of the scanning line P. This structure is advantageous in that only the contact member 28 extending across the width of the belt 4 is required to be provided as fixedly attached to the bottom surface of the optical recording head 1.

FIGS. 6 through 9 show another embodiment of the present invention in which urging means (leaf spring 31 in the illustrated example) is provided to have the back-up roller 30 urged against the belt 4 thereby insuring that the belt 4 is always aligned with the imaginary scanning line P. In the illustrated example, there is provided a belt supporting unit 33 which supports the endless photosensitive belt 4 and which is designed to be detachably mounted in the optical recording apparatus. The unit 33 includes a pair of side plates 32, 32, between which extends the pair of supporting rollers 1 and 2 and the back-up roller 30. As will be made clear later, it is to be noted that the back-up roller 30 in the present embodiment is provided to be movable in position with respect to the side plates 32, 32. The leaf spring 31 is provided with its base end fixed to the corresponding side plate 32.

Figure 9:
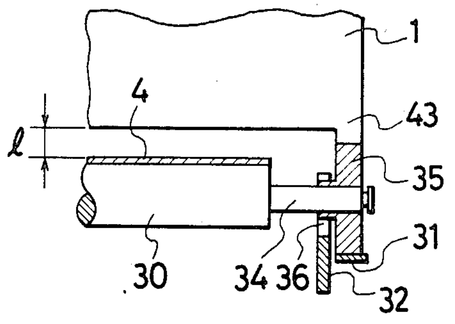

Provided integrally with the back-up roller 30 is a pair of shafts 34 as extending on both ends and each of the shafts 34 is provided with a bearing 35 at its extreme end. Each of the side plates 32 is provided with a bent notch 36 including a vertical guide portion, which cuts into the corresponding side plate 32 from one side thereof, and an inclined guide portion which extends at an angle from the end of the vertical guide portion. The shafts 34 on both ends of the back-up roller 30 are loosely fitted into the respective notches 36 so that the movement of the back-up roller 30 is guided by the shape of the notch 36. Since the bearing 35 is mounted at the tip end of the shaft 34, it is located outside of the side plate 32 as best shown in FIG. 9, and the free end of the leaf spring 31 is in contact with the bearing 35 as also best shown in FIG. 9. Thus, the back-up roller 30 is always urged upward by the leaf spring 31 as guided by the notches 36, 36 until the bearing 35 comes into contact with a bottom rim 43 of the recording head 1. Through the engagement between the bearing 35 and the rim 43, the back-up roller 30 may be located at a predetermined position.

It is to be noted that, in the illustrated embodiment, the supporting roller 2 is a follower roller, which is supported to be freely rotatable, and the other supporting roller 3 is a driving roller, which is driven to rotate by a driving unit (not shown) via a driving gear 40 fixedly mounted at one end to cause the belt 4 to advance. The follower supporting roller 2 is also provided with a bearing 37 one at each end, which is slidingly received in a slot 38 formed at one end of the side plate 32. Also provided is a coil spring 39 as received in the slot 38 thereby urging the roller 2 to tend to move away from the other paired roller 3, so that the endless belt 4 may be maintained in tension. Of importance, it is so set that the force applied by the springs 39 to the belt 4 is weaker than the force applied by the leaf springs 31 to the belt 4.

Figure 7:
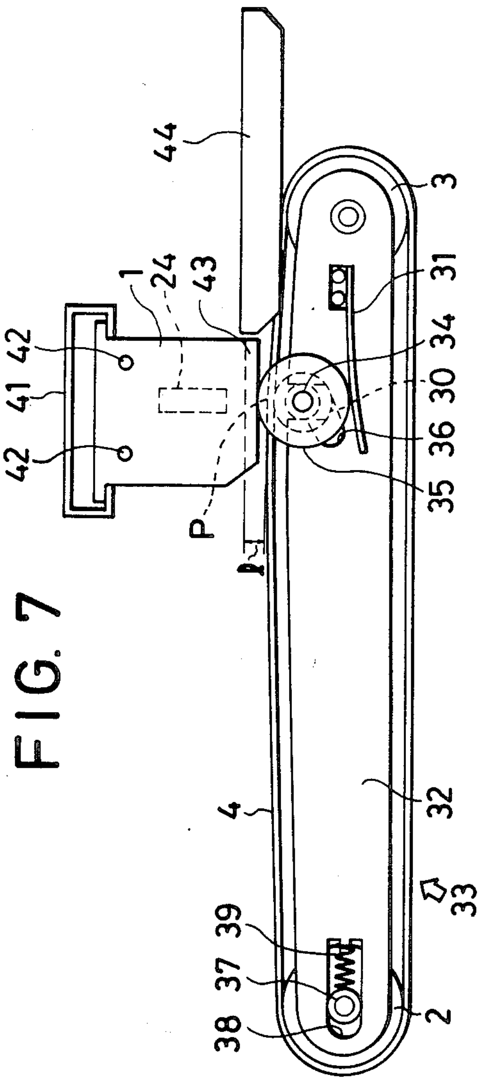
Figure 8:
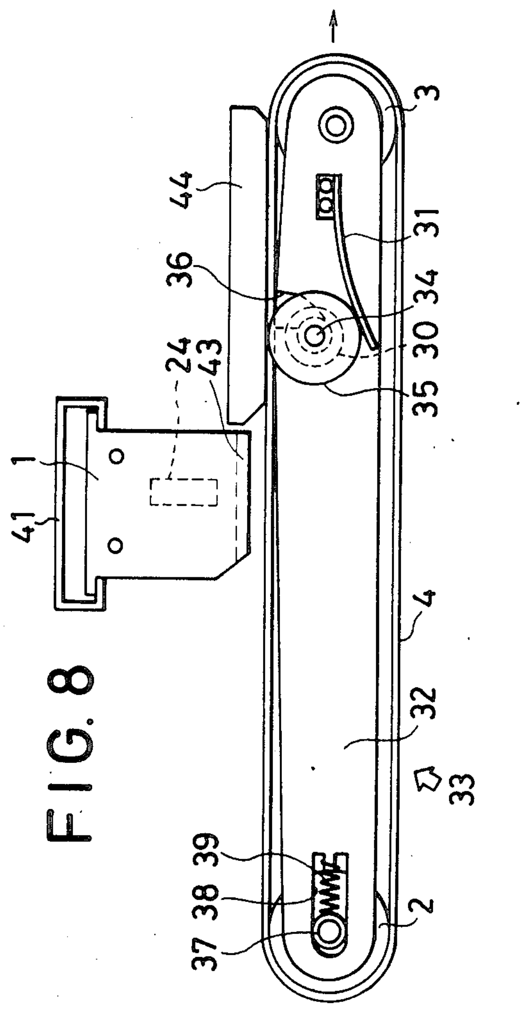

As will be made clear later, the optical recording apparatus of the present invention includes a pair of main side plates which define part of its main frame, and between these main side plates is fixedly mounted a guide rail 41 along which the optical recording head 1 may be slidingly moved to be detachably mounted in position. The optical recording head 1 of the illustrated embodiment is generally rectangular in shape and provided with a pair of alignment pins 42, 42 at one end thereof. One of the main side plates is provided with a pair of holes, into which the alignment pins 42, 42 are respectively inserted for locating the head 1 in position when mounted. It should also be noted that the belt supporting unit 33 is also detachably mounted and it may be mounted into position or dismounted from the apparatus by slidingly moving it in the direction normal to the lengthwise direction of the guide rail 41. FIG. 7 shows the condition in which the belt supporting unit 33 is set in position and FIG. 8 shows the condition in which the unit 33 is slidingly moved out of the operating position to the right as viewing into the drawing as indicated by the arrow. A pair of guide plates 44, 44 is disposed adjacent to the recording head 1 in position and the back-up roller 30 comes to be located at its retracted position through engagement between the guide plate 44 and the corresponding bearing 35 as the unit 33 is moved out of the operating position.

The optical recording head 1 includes the focusing device 24 as fixedly mounted thereon at a predetermined distance from the bottom surface thereof. As described above, the endless belt 4 supported around the supporting rollers 2 and 3 and the back-up roller 30 advances as driven by the driving roller 3. In the illustrated embodiment, since the location of the scanning line P is positively determined by the back-up roller 30 which is set in position through the engagement between the bearing 35 and the rim 43 as urged by the leaf spring 31, that portion of the belt 4 moving past the back-up roller 30 can be maintained always at the same location even if the other portion of the belt 4 is in undulating motion or vibration. As a result, the image formed along the scanning line P may be maintained in focus at all times. That is, at the scanning line P, the distance between the focusing device 24 and the belt 4 and thus the distance 1 between the bottom of the head 1 and the belt 4 is maintained unchanged at all times.

Because of manufacturing tolerances, the round length of endless belt 4 may differ one from another. However, this does not present any problem to the present invention since such differences in round length may be absorbed by the novel structure of the present invention. That is, in the case where the round length of an endless belt 4 is slightly shorter than a reference value, since the spring force acting on the back-up roller 30 is stronger than that acting on the follower roller 2, it is insured that the bearing 35 comes into contact with the rim 43 thereby having the back-up roller 30 located in position. In this case, the follower roller 2 is moved slightly closer to the driving roller 3 against the force of the spring 39. Conversely, in the case where the round length of an endless belt 4 is slightly longer than expected, the back-up roller 30 is also set in position through engagement between the bearing 35 and the rim 43 and the follower roller 2 in this case is moved further away from the driving roller 3 under the force of the spring 39 so that the endless belt 4 is still maintained in tension thereby forming no slack in the belt 4. Thus, no slip occurs between the driving roller 3 and the belt 4 and the belt 4 may be advanced at constant speed. In the illustrated embodiment, the developing unit 6 is located adjacent to the driving roller 3 which does not change its position with respect to the belt supporting unit 33 and only the follower roller 2 is moved closer to or separated further away from the driving roller 3 to keep the belt 4 in tension, so that the relative positional relation between the developing unit 6 and the belt 4 remains unchanged, which, in turn, insures to maintain developing characteristics unchanged.

As briefly described previously, the belt supporting unit 33 may be detached from the present optical recording apparatus as pulled in the direction indicated by the arrow in FIG. 8. When the unit 33 is pulled as indicated, the bearing 35 comes to be disengaged from the rim 43 and then comes into engagement with the guide plate 44, which is positioned at a lower level than the rim 43. Thus, the back-up roller 30 is pushed downward to its retracted position from its advanced position against the force of leaf spring 31 as guided by the notch 36. Under the condition, the back-up roller 30 does not apply a force against the belt 4, which is now extended between the rollers 2 and 3 and kept in tension only under the force of the spring 39. Preferably, the guide plate 44 is so provided that it comes into engagement with the bearing 35 as soon as the unit 33 is pulled in the indicated direction. With such a structure, the belt 4 is well prevented from being damaged due, for example, to scratches which may be caused as the unit 33 is pulled out of the apparatus. It is also preferable to provide means for keeping the back-up roller 30 in the retracted position while the optical recording head 1 is being mounted or dismounted.

Figure 10:
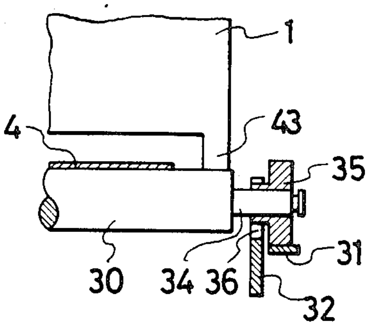
FIG. 10 is a schematic illustration showing a modification of the structure shown in FIGS. 6–9.

FIG. 10 shows a modified structure in which, instead of the bearing 35, the back-up roller 30 itself is brought into contact with the rim 43 in locating the back-up roller 30 in position. It is to be noted that in this case the back-up roller 30 must be longer than the width of belt 4. As a further alternative, it may be so structured that the shaft 34 is brought into contact with the rim 43 in positioning the back-up roller 30, or any other structure is also possible in positioning the back-up roller 30 within the meaning of the present invention. Furthermore, it is to be noted that the back-up roller 30 may take any desired shape, and, for that matter, it may be replaced by a back-up plate or any other member having a desired shape.

Figure 11:
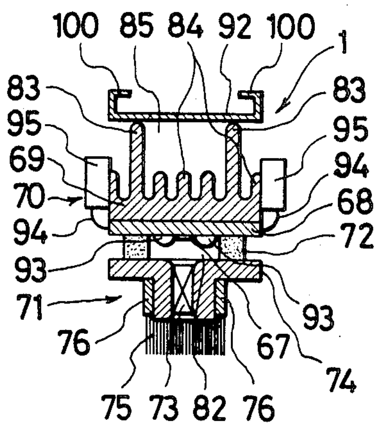
FIG. 11 is a schematic illustration in cross section showing the detailed structure of an optical recording head constructed in accordance with a further embodiment of the present invention and advantageously applicable to the system of FIG. 1.
Figure 12:
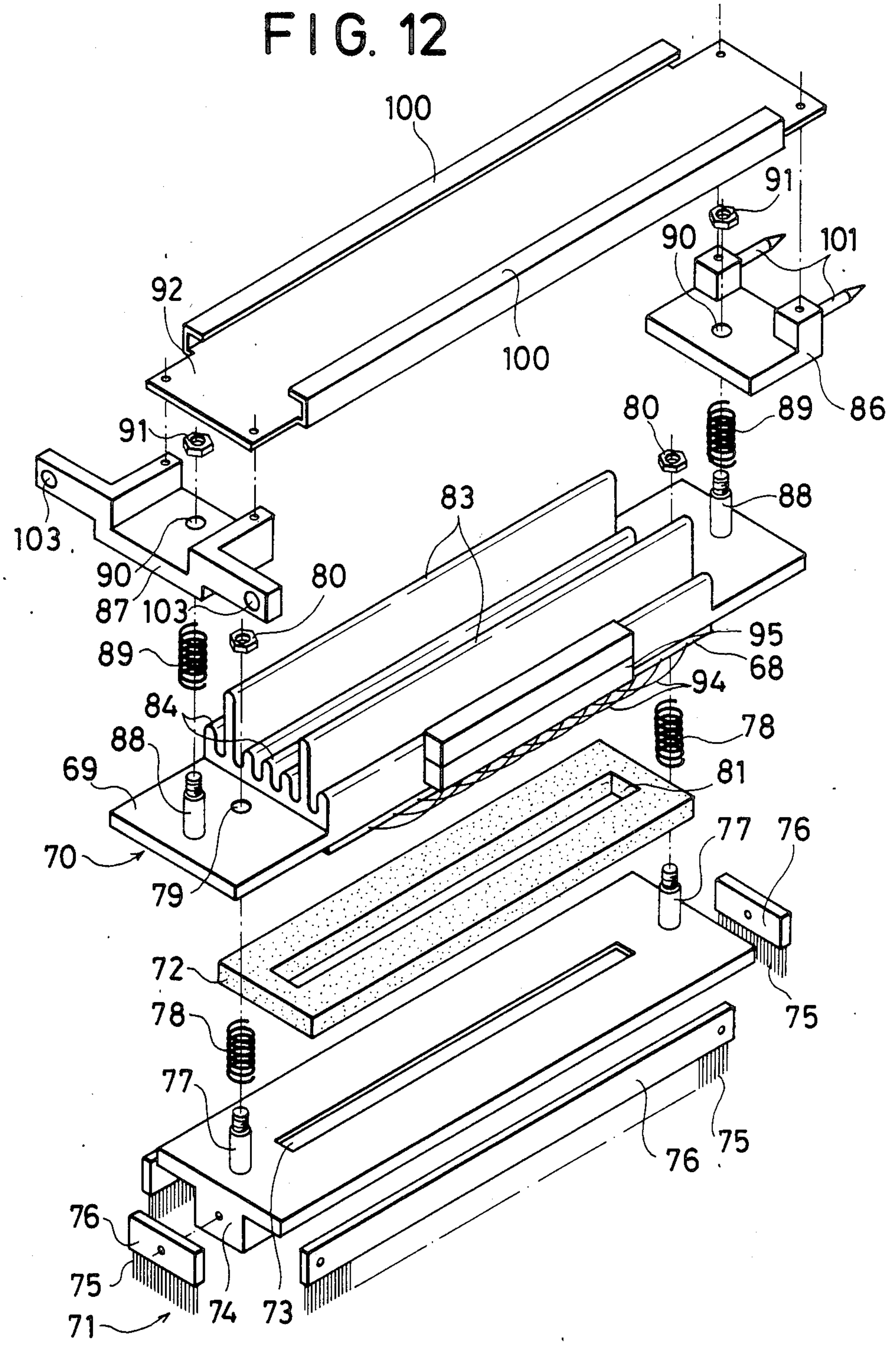
FIG. 12 is an exploded, perspective view showing how structural elements are assembled to define the recording head shown in FIG. 11.

FIGS. 11 and 12 show the detailed structure of an optical recording head 1 constructed in accordance with one embodiment of the present invention and suitable for use in the system shown in FIG. 1. As shown, the optical recording head 1 embodying the present invention generally includes a light emitting unit 70, an image forming unit 71 and a block, which will be described later. The units 70 and 71 are interconnected with a seal member 72 sandwiched therebetween. The seal member 72 is preferably comprised of an elastic material. The light emitting unit 70 includes a plurality of light emitting diodes 67 arranged in the form of an array and mounted on a substrate 68, such as a ceramic substrate, and a supporting plate 69, which is fixedly attached to the substrate 68 at the side opposite to the side where the light emitting diode array 67 is mounted and which also serves to dissipate heat energy to the surroundings.

The image forming unit 71 includes an image forming element 73, such as a selfoc lens array, a holding member 74 for holding the selfoc lens array 73, and a brush holder 76 for holding an electrically insulating brush 75 provided at the bottom of the holding member 74 around the periphery thereof in the form of a closed loop. It is to be noted that when the recording head 1 is detachably mounted in position as described previously, the bottom end of the brush 75 comes into contact with the belt 4 thereby sealing the space defined between the head 1 and the belt 4 so that any foreign matter, such as debris and floating toner, is prevented from being attached to the selfoc lens array 73 at its bottom.

As described before, the seal member 72 is interposed between the holding member 74 and the supporting plate 69, a pair of pins 77, 77, each planted in the holding member 74, having a threaded portion at its top end and having a coil spring as onserted thereon, are passed through respective holes 79, 79 provided in the supporting plate 69, and a nut 80 is screwed onto the threaded portion of each of the pins 77, 77, thereby assembling the light emitting unit 70 and the image forming unit 71 together. The seal member 72 is generally in the form of a plate provided with an elongated slot 81 at its center, and, thus, when assembled, the space 82 defined by the supporting plate 69, seal member 72 and holding member 74 is kept sealed from the ambient. For this reason, undesired materials are prevented from sneaking into the space 82 so that the LED array 67 mounted on the substrate 68 and the top surface of selfoc lens array 73 may be kept clean. Preferably, the seal member 72 is comprised of various rubber materials, foam urethane and the like, which are easily deformable. Thus, the seal member 72 is deformed as compressed when the nuts 80 are tightened, so that the distance between the light emitting unit 70 and the image forming unit 71 may be easily adjusted by changing the tightening condition of the nuts 80. In this manner, the distance between the LED array 67 and the selfoc lens array 73 may be adjusted optimally.

The supporting plate 69 is provided with a pair of long fins 83 and a plurality of short fins 84 at the back side thereof. As will become clear later, an air passage 85 for passing a flow of cooling air therethrough is defined by the pair of long fins 83 and a plate 92. Blocks 86 and 97 are provided on both ends of the supporting plate 69. A pair of pins 88, 88 are planted in the supporting plate 69 one at each end, and each of the pins 88, 88 is provided with a threaded portion at its top end. A coil spring 89 is loosely onserted onto each of the pins 88, 88. Each of the blocks 86 and 87 is provided with a hole 90, through which the corresponding pin 88 extends when mounted on the supporting plate 69 in position. The blocks 86 and 87 are set in position as fixedly mounted on the supporting plate 69 by having a nut 91 screwed onto the threaded portion of each of the pins 88, 88. It should be noted that the distance between the blocks 86, 87 and the supporting plate 69 may be adjusted by changing the tightening conditions of the nuts 91, 91 on the pins 88, 88. As will become clear later, the blocks 86 and 87 are fixedly attached to the main frame of the optical recording apparatus, so that the distance between the selfoc lens array 73 and the photosensitive belt 4 may be set optimally by adjusting the tightening conditions of the nuts 91, 91 on the pins 88, 88. The plate 92, defining part of the air passage 85 is connected to the blocks 86 and 87 on both ends as best shown in FIG. 12.

As is obvious for one skilled in the art, the surface of the substrate 68 on which the LED array 67 is mounted is also provided with an interconnection pattern (not shown) and wire 93 is provided to establish electrical connections between the LED array 67 and the interconnection pattern, which is connected to connectors 95, 95 for connection to external driving circuitry by means of leads 94. The connectors 95, 95 are fixedly attached to the supporting plate 69 one at each side.

Figure 13:
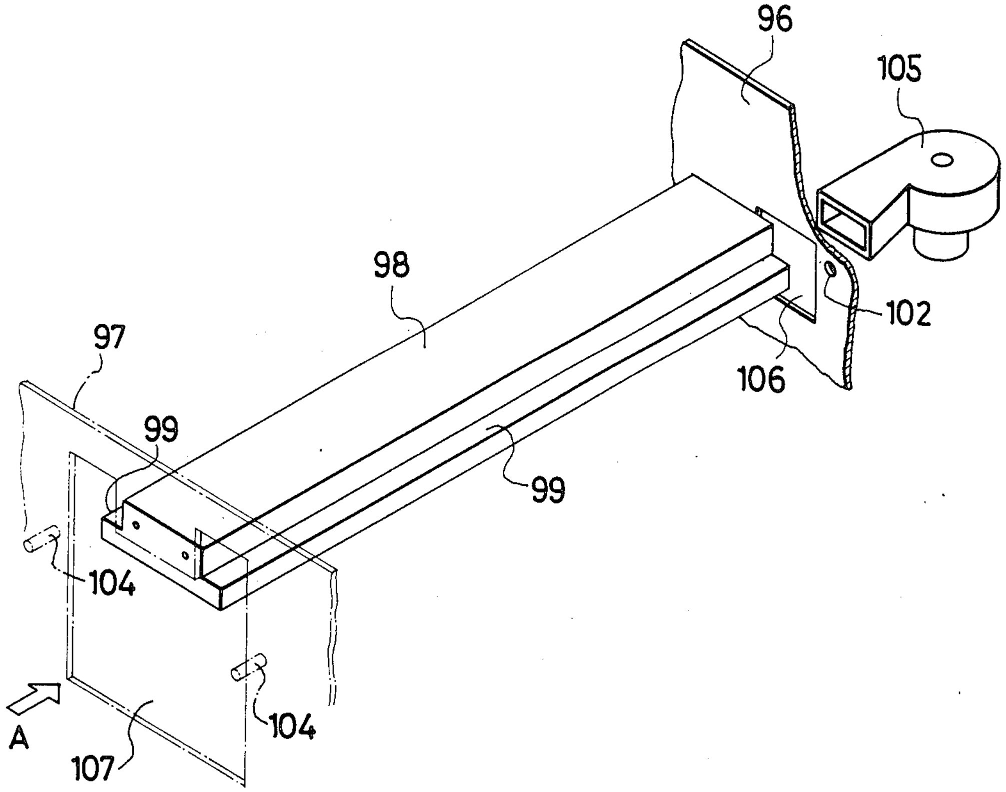
FIG. 13 is a perspective view showing a mounting structure for mounting the recording head of FIG. 12 in the optical recording apparatus of FIG. 1.

FIG. 13 shows schematically how the optical recording head 1 as described above is detachably mounted in position in the optical recording apparatus. As shown in FIG. 13, the optical recording apparatus includes a pair of main side plates 96 and 97 forming part of main frame of the apparatus. The main side plates 96 and 97 are provided as spaced apart from each other and a guide rail 98 is fixedly provided as extending between the main side plates 96 and 97. The guide rail 98 is provided with a pair of wings 99, 99 extending outwardly from both sides thereof. On the other hand, the plate 92 of the recording head 1 is provided with a pair of channel-forming portions 100, 100, which are defined by bending side sections of the plate 92 to form channels. Therefore, when the recording head 1 is to be set in position, the recording head 1 is moved into the interior of the apparatus through an opening 107 provided in the main side plate 97 as indicated by the arrow A through engagement between the channel-forming portions 100, 100 of the recording head 1 and the wings 99, 99 of the guide rail 98.

As shown in FIG. 12, the block 86 is fixedly provided with a pair of reference pins 101, 101, which are fitted into respective holes 102, 102 provided in the side plate 96 at the final stage of mounting the recording head 1 in position. On the other hand, the other block 87 is provided with reference holes 103, 103 into which reference pins 104, 104 planted in the side plate 97 are fitted at the final stage of mounting the recording head 1 in position. In this manner, the recording head 1 may be properly set in position through engagement between the pins 101 and the holes 102 and between the pins 104 and the holes 103.

As shown in FIG. 13, a blower 105 is provided outside of the side plate 96 such that a stream of air flowing out of the blower 105 may be directed into the air passage 85 through an opening 106 formed in the side plate 96. The stream of air after passing through the air passage 85 is then discharged out of the apparatus through the other opening 107 formed in the side plate 97. In this manner, since the cooling air may be constantly forced to flow through the air passage 85 along the side of the supporting plate 69 on which the fins 84 are formed, dissipation of heat from the supporting plate 69 may be carried out effectively and the LEDs 67 are prevented from being heated. This is rather critical because the operating conditions of LEDs are sensitive to temperature changes. With the structure of the present invention, the LEDs may be maintained substantially at the same temperature level during operation so that optical image forming characteristics may be maintained substantially at constant.

In the air passage 85, only the fins 84 are present and the connectors 95, 95, which are rather large in size, are located outside of the air passage 85, and, thus, there is no obstruction against the flow of air through the air passage 85, thereby insuring that the dissipation of heat from the fins 83, 84 to the air flow may be maintained at maximum. Such a structure is quite advantageous because the temperature rise of LEDs 67 may be prevented from occurring more effectively.

Figure 14:
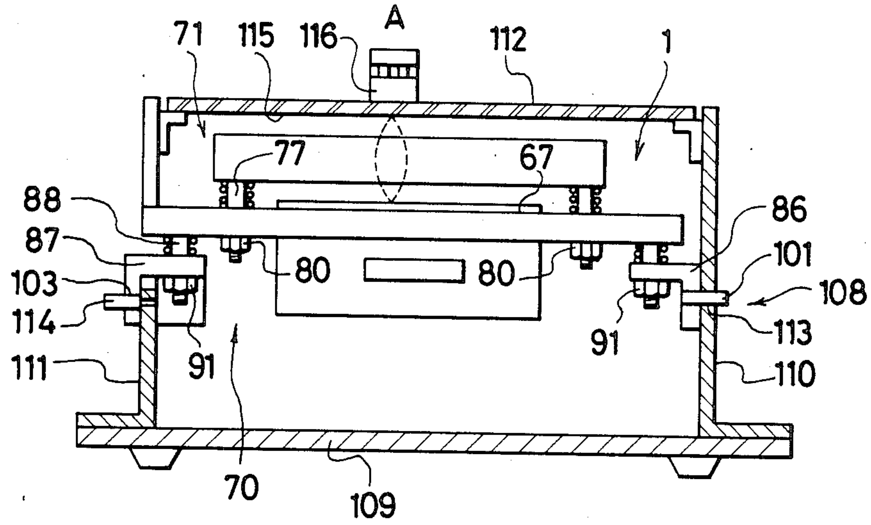
FIG. 14 is a schematic illustration showing a fixture on which the optical recording head of FIG. 12 may be temporarily mounted to carry out required adjustment operations.

As briefly described above, in order to obtain optimum conditions in forming an image on the belt 4, the tightening conditions for the nuts 80 and 91 are suitably changed to adjust the focusing conditions of selfoc lens array 73. However, such adjustments are rather difficult to carry out once the recording head 1 has been mounted in position. In accordance with another aspect of the present invention, adjustment of focusing condition of selfoc lens array 73 is carried out using an adjustment fixture 108 shown in FIG. 14 prior to assemblage into the main apparatus.

The adjustment fixture 108 includes a fixture base 109, a pair of fixture side plates 110, 111 fixedly attached to the base 109 and a ground glass 112 fixedly attached to the top ends of the side plates 110, 111 to be in parallel with the base 109. The recording head 1 is temporarily mounted in position in the fixture 108 with its reference pins 101 fitted into reference holes 113 formed in the side plate 110 and its reference holes 103 inserted by reference pins 114 provided as planted on the side plate 111. It is to be noted that the reference holes 113 are defined corresponding in shape, size and pitch to the reference holes 102 and similarly the reference pins 114 are defined corresponding in shape, size and pitch to the reference pins 104. In addition, the spacing between the fixture side plates 110 and 111 is set equal to the spacing between the main side plates 96 and 97. It should further be noted that the distance between the reference holes 113 and an image forming surface 115 defined by the bottom surface of ground glass 112 is set equal to the distance between the reference holes 102 of main side plate 96 and the imaging outer surface of photosensitive belt 4.

With the recording head 1 mounted in position in the fixture 108, the LEDs 67 are activated to have light emitted, and while observing light spots formed on the image forming surface 115 by a loupe 116, the tightening conditions of nuts 80 and 91 are changed, for example, by a pair of pliers to adjust the focusing condition of sulfoc lens array 73. With such a structure, the nuts 80 and 91 may be easily tightened and untightened using a pair of pliers and the like and the light spots formed on the image forming surface 115 may be easily observed so that the adjustment of focusing condition for selfoc lens array 73 may be carried out with ease and high accuracy. Moreover, since the mounting condition of the recording head 1 in the adjustment fixture 108 is the same as the mounting condition of the recording head 1 in the main apparatus, once the adjustment has been suitably carried out as mounted in the fixture 108, the recording head 1 may be assembled into the main apparatus without requiring any further adjustment.

Figure 15:
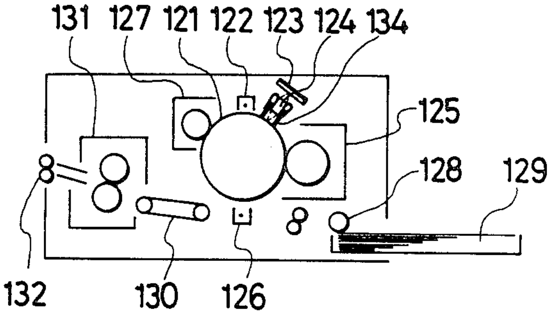
FIG. 15 is a schematic illustration showing a copier using a drum-shaped photosensitive member in which the optical recording or write-in head embodying the present invention is provided.
Figure 16:
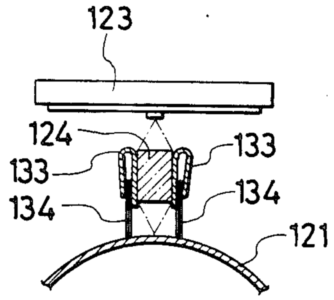
FIG. 16 is a schematic illustration showing the detailed structure of the optical recording head provided in the copier of FIG. 15.
Figure 17:
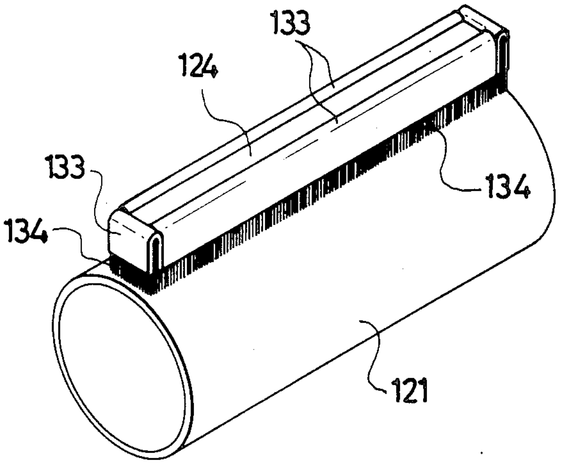
FIG. 17 is a perspective view showing the relative positional relation between the photosensitive drum and the optical recording head of FIG. 16.

FIGS. 15 through 17 show another aspect of the present invention when applied to an electrophotographic printer employing a photosensitive drum. As shown, the printer includes a photosensitive drum 121, which is driven to rotate at constant speed, and a corona charger 122 for charging the drum 121 uniformly, an LED array 123 provided with a plurality of LEDs, a selfoc lens array 124, a developing unit 125, an image transfer corona unit 126 and a cleaning unit 127 as arranged around the drum 121. In operation, as the drum 121 is driven to rotate at constant speed, its peripheral surface is uniformly charged by the charger 122 and the uniform charge is selectively dissipated by light applied from the LED array 123 through the selfoc lens array 124 as an image signal is supplied to the array 123 exteriorly thereby forming an electrostatic latent image, which is then converted into a visible image, typically toner image, when developed by the developing unit 125. The toner image is then transferred to a sheet of transfer paper 129 by means of the transfer corona unit 126 as the sheet of transfer paper, 129 is transported in association with the rotation of the drum 121. After transfer, the sheet of transfer paper 129 is transported to an image fixing device 131 by means of a transport belt 130, and, thereafter, it is discharged out of the apparatus by means of a paper discharging roller 132. On the other hand, as the drum 121 further rotates, it comes to be cleaned by the cleaning unit 127 thereby preparing for the next cycle of operation.

In accordance with the present invention, the selfoc lens array 124, generally in the form of a rectangular rod, is fitted into a frame 133 which completely surrounds the four sides of the selfoc lens array 124, and an electrically insulating brush 134 is provided as fixedly attached to the frame 133. The brush 134 is preferably provided in high density and is comprised of a sufficiently elastic material. The brush 134 is so provided that its tip end is in contact with the peripheral surface of the drum 121 when the selfoc lens array 124 is mounted in position.

Similarly with the previous embodiments, the space between the selfoc lens array 124 and the drum 121 is sealed by the brush 134, unwanted material, such as debris and toner,. is prevented from being deposited onto the bottom surface of the selfoc lens array 124. Thus, the amount of light passing through the lens array 124 is prevented from being decreased and the quality of a latent image formed on the drum 121 is maintained at high level. Moreover, since the brush 134 is comprised of an electrically insulating and sufficiently elastic material, the brush 134 does neither adversely affect the charging condition on the drum 121 nor provide possible scratches or scars on the drum 121.

Figure 18:
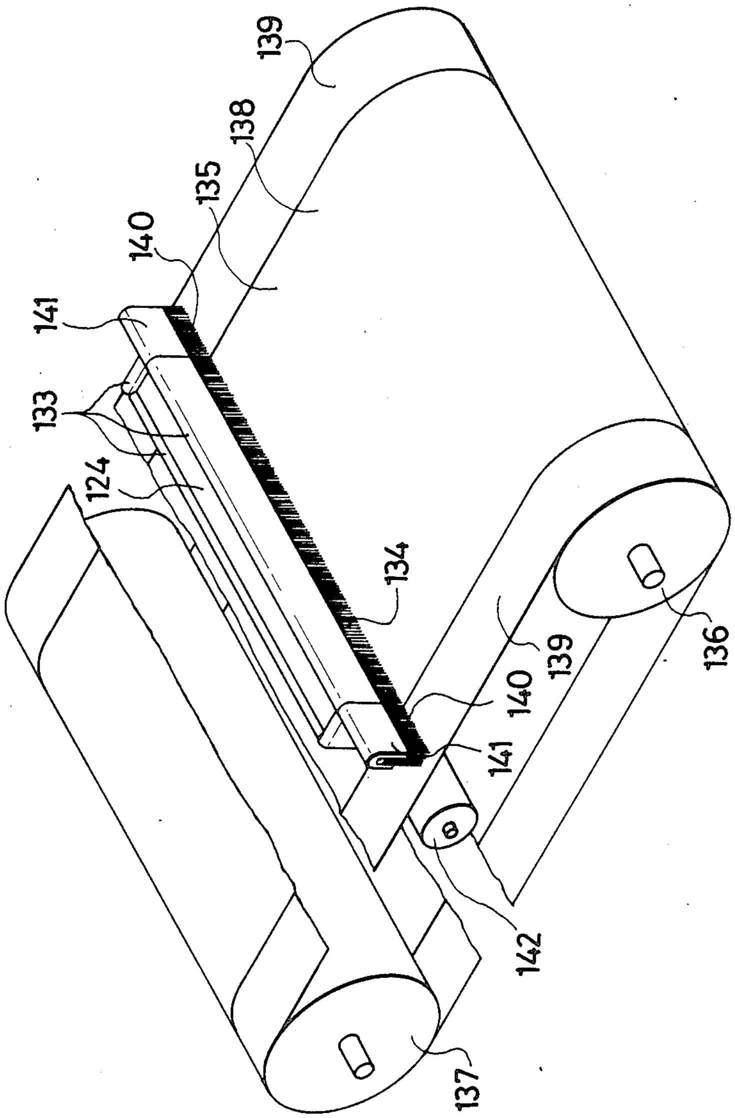
FIG. 18 is a modification of the structure shown in FIGS. 15–17 when applied to a photosensitive member in the form of an endless belt.

FIG. 18 shows a modification of the structure described above. In this embodiment, the photosensitive drum 121 is replaced by an endless photosensitive belt 135. The belt 135 is supported as extending between a pair of support rollers 136 and 137, one of which is a driving roller and the other is a follower roller. The photosensitive belt 135 is divided into three endless regions: a center photosensitive region 138 and a pair of electrically conductive peripheral regions 139, 139 on both sides of the center region. In the present embodiment, an electrically conductive brush 141 is provided as fixedly attached to an additional frame 141, which, in turn, is fixedly attached to or integrally formed with the frame 133. The conductive brush 141 is maintained in contact with the corresponding electrically conductive region 139 so that the regions 139 may be grounded through the brushes 141. It should further be noted that a back-up roller 142 is provided at the inner side of the belt 135 as extending in parallel with the selfoc lens array 124. Such a back-up element does not need to be a roller and it may take any other desired shape as long as it serves to prevent the belt 135 from being deformed due to contact with the brushes 134 and 140.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. An optical recording apparatus comprising:

a belt-shaped imaging member having a first surface on which an image is to be formed and a second surface which is opposite to said first surface;

means for advancing said imaging member along a predetermined path;

means for uniformly applying charge to said first surface of said imaging member;

an optical recording head disposed downstream of said charge applying means with respect to the direction of advancement of said imaging member, said optical recording head applying light containing image information to said uniformly charged first surface of said imaging member along an image exposure line thereby causing said charge to dissipate selectively to form an electrostatic latent image thereon;

a back-up member disposed to be in contact with said second surface of said imaging member generally in parallel with said image exposure line; and contact means fixedly attached to said head, said contact means being in contact with said first surface of said imaging member generally opposite to said back-up member thereby allowing to prevent that portion of said imaging member which is located generally at said image exposure line from moving in a direction generally normal to the advancing direction of said imaging member.

2. The appartus of claim 1 wherein said imaging member is an endless belt extended at least between a pair of rollers and said advancing means includes at least one of said pair of rollers, which is driven to rotate.

3. The apparatus of claim 2 wherein said imaging member includes a photosensitive layer.

4. The apparatus of claim 1 wherein said back-up member is a roller extending across said imaging member in contact with said second surface thereof.

5. The apparatus of claim 2 wherein one of said pair of rollers is used as said back-up member.

6. The apparatus of claim 1 wherein said contact means includes an electrically insulating and elastic material.

7. The apparatus of claim 6 wherein said material is in the form of a brush.

8. The apparatus of claim 7 wherein said contact means is provided along a periphery of a bottom surface of said optical recording head thereby forming an enclosed space between said head, imaging member and contact means.

9. The apparatus of claim 1 wherein said optical recording head includes a light-emitting diode array which is scanned from one end to the other thereby selectively activating light-emitting diodes provided therein and a focusing lens array for focusing light emitted from said light-emitting diode array onto said imaging member at said image exposure line.

10. An optical recording apparatus comprising:

an endless belt-shaped imaging member having a first surface on which an image is to be formed and a second surface which is opposite to said first surface;

means for advancing said imaging member along a predetermined path;

means for uniformly applying charge to said first surface of said imaging member;

an optical recording head disposed downstream of said charge applying means with respect to the direction of advancement of said imaging member, said optical recording head applying light containing image information to said uniformly charged first surface of said imaging member along an image exposure line thereby causing said charge to dissipate selectively to form an electrostatic latent image thereon;

a back-up member supported to be movable between an advanced position where said back-up member is pressed against said second surface of said imaging member generally in parallel with said image exposure line and a retracted position where said back-up member is not pressed against said imaging member; and first urging means for urging said back-up member into said advanced position thereby preventing that portion of said imaging member which is located generally at said image exposure line from moving in a direction generally normal to the advancing direction of said imaging member; and stopper means provided at a bottom of said optical recording head wherein said back-up member is provided with a pair of bearings on both ends so that said back-up member is set in said advanced position when said bearings are brought into contact with said stopper means by means of said first urging means.

11. The apparatus of claim 10 wherein said stopper means includes a pair of rims formed at the bottom of said optical recording head.

12. An optical recording head for applying light containing image information to an imaging member to form an electrostatic latent image thereon, comprising:

first supporting means for supporting a lens array comprised of a plurality of lenses;

second supporting means for supporting a light-emitting array comprised of a plurality of light-emitting diodes;

first adjusting means for adjusting a distance between said first and second supporting means;

third supporting means including a first reference means for locating said third supporting means in a desired position through engagement with a second reference means provided in a stationary object;

second adjusting means for adjusting a distance between said second and third supporting means; and channel means for slidingly engaging said second reference means into engagement with said stationary object.

13. The optical recording head of claim 12 wherein said first adjusting means includes at least one pin fixedly held by said first supporting means, said pin being provided with a threaded portion at least partly and extending through a corresponding hole provided in said second supporting means, a coil spring fitted onto said pin as interposed between said first and second supporting means, and a nut screwed onto the threaded portion of said pin thereby keeping said first and second supporting means together.

14. The optical recording head of claim 12 wherein said stationary object is a main frame of an optical recording apparatus in which said head is incorporated, and wherein said first reference means includes a first pair of reference pins and said second reference means includes a first pair of reference holes provided in said main frame into which said first pair of reference pins may be fitted for locating said third supporting means in position.

15. An optical recording head for applying light containing image information to an imaging member to form an electrostatic latent image thereon, comprising:

first supporting means for supporting a lens array comprising of a plurality of lenses;

second supporting means for supporting a light-emitting array comprised of a plurality of light-emitting diodes;

first adjusting means for adjusting a distance between said first and second supporting means;

a deformable seal member interposed between said first and second supporting means, said seal member being provided with an opening allowing light emitted from said light-emitting array to pass through said opening to said lens array; and channel means for slidingly engaging the optical recording head into engagement with a stationary object.

16. The optical recording head of claim 15 wherein said first adjusting means includes at least one pin fixedly held by said first supporting means, said pin being provided with a threaded portion at least partly and extending through a corresponding hole provided in said second supporting means, a coil spring fitted onto said pin as interposed between said first and second supporting means, and a nut screwed onto the threaded portion of said pin thereby keeping said first and second supporting means together.

17. The optical recording head of claim 15 further comprising:

third supporting means including first reference means for locating said third supporting means in position through engagement with second reference means provided in a stationary object; and second adjusting means for adjusting a distance between said second and third supporting means.

18. An optical recording head for applying light containing image information onto a uniformly charged imaging member to form an electrostatic latent image by having the charge selectively dissipated by the light applied thereto, comprising:

a light source for emitting said light containing image information;

a focusing element for focusing said light emitted from said light source onto said imaging member; and an electrically insulating brush fixedly attached around said focusing element and extending downward over a predetermined distance from said focusing element with the brush's tip end in contact with said imaging member thereby enclosing a space defined between said focusing element and said imaging member by said brush.

19. The optical recording head of claim 18 wherein said focusing element is elongated in shape thereby extending across a width of said imaging member and said head further comprises a holder frame extending around four sides of said elongated focusing element for fixedly holding said brush.

20. The optical recording head of claim 19 wherein said imaging member includes a photosensitive region and an electrically conductive region and said head comprises an additional holder frame fixedly holding an electrically conductive brush such that one portion of the tip end of said electrically insulating brush is disposed to be in contact with said photosensitive region and another portion of the tip end of said electrically conductive brush is disposed to be in contact with said electrically conductive region.

21. The optical recording head of claim 20 wherein said imaging member is belt-shaped and said head comprises a back-up member disposed generally in parallel with said elongated focusing element in contact with said belt-shaped imaging member at the side opposite to the side where said focusing element is disposed.

* * * * *